US008915234B2

(12) United States Patent
Gulke et al.

(10) Patent No.: US 8,915,234 B2
(45) Date of Patent: Dec. 23, 2014

(54) FUEL CAP

(75) Inventors: John Gulke, Fond du Lac, WI (US); Christy L. Matuszewski, Oak Creek, WI (US); Geoffrey P. Zabrowski, Racine, WI (US); Elliot Matel, Milwaukee, WI (US); Peter D. Shears, Wauwatosa, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 698 days.

(21) Appl. No.: 12/911,597

(22) Filed: Oct. 25, 2010

(65) Prior Publication Data

US 2012/0097680 A1     Apr. 26, 2012

(51) Int. Cl.
*F02M 33/02*     (2006.01)
*B60K 15/04*     (2006.01)
*B60K 15/035*     (2006.01)

(52) U.S. Cl.
CPC ... *B60K 15/0406* (2013.01); *B60K 2015/03547* (2013.01); *B60Y 2200/225* (2013.01)
USPC .......................................... 123/520; 220/375

(58) Field of Classification Search
CPC ..................... B60K 15/0409; B60K 15/03504; B60K 15/0406; B60K 2015/03547; B65D 55/165
USPC ........... 123/41.54, 198 E, 371, 373, 375, 520, 123/198 C, 198 D, 468, 469, 41.51; 220/DIG. 33, 372, 374, 522, 521, 373, 220/367.1, 303, 581, 582, 4.14, 4.21, 4.26, 220/4.27, 4.01, 200, 371, 375
See application file for complete search history.

(56) References Cited

U.S. PATENT DOCUMENTS

| | | | |
|---|---|---|---|
| 1,509,796 | A | 9/1924 | Tokuhisa |
| 1,518,467 | A | 12/1924 | Van Pelt |
| 1,543,256 | A | 6/1925 | Grant |
| 1,841,691 | A | 1/1932 | Wilson |
| 2,061,958 | A | 11/1936 | Chapman |
| 2,095,460 | A | 10/1937 | Swords |
| 2,428,426 | A | 10/1947 | Lindsay |
| 2,555,189 | A | 5/1951 | Fuchslocher |
| 2,555,199 | A | 5/1951 | Meyerhoefer |
| 2,603,308 | A | 7/1952 | McCall |
| 2,626,678 | A | 1/1953 | Yant |
| 2,663,456 | A | 12/1953 | Schultz et al. |
| 2,675,093 | A | 4/1954 | McCall et al. |
| 3,451,584 | A | 6/1969 | Degaetano |

(Continued)

FOREIGN PATENT DOCUMENTS

| | | |
|---|---|---|
| CA | 1107528 | 8/1981 |
| CA | 2248502 | 3/1999 |

(Continued)

*Primary Examiner* — Hai Huynh
*Assistant Examiner* — Gonzalo Laguarda
(74) *Attorney, Agent, or Firm* — Foley & Lardner LLP (57) ABSTRACT

A cap assembly includes a body and a tether. The body is configured to be fastened to a container for closing an opening in the container. An aperture is formed in the body, and the tether has a fastener, where a portion of the fastener extends through the aperture in the body. A gap is formed between the portion of the fastener and the body that allows for venting of vapors from the container around the portion of the fastener that is extending through the aperture.

20 Claims, 7 Drawing Sheets

(56) References Cited

U.S. PATENT DOCUMENTS

| | | | |
|---|---|---|---|
| 3,546,853 A | 12/1970 | Claar | |
| 3,572,013 A * | 3/1971 | Hansen | 96/138 |
| 3,572,014 A * | 3/1971 | Hansen | 96/138 |
| 3,727,597 A * | 4/1973 | Hensler | 123/519 |
| 3,748,829 A | 7/1973 | Joyce et al. | |
| 3,815,752 A | 6/1974 | Hoffman et al. | |
| 3,961,724 A | 6/1976 | Kapsy | |
| 4,028,075 A | 6/1977 | Roberge | |
| 4,036,393 A | 7/1977 | Neiman | |
| 4,091,179 A | 5/1978 | Szabo | |
| 4,113,138 A | 9/1978 | Fields et al. | |
| D256,721 S | 9/1980 | Boller et al. | |
| 4,320,853 A | 3/1982 | Moore | |
| 4,350,508 A | 9/1982 | Santoro et al. | |
| 4,416,108 A | 11/1983 | Ghandhi | |
| 4,512,499 A | 4/1985 | Uuskallio | |
| 4,572,394 A | 2/1986 | Tanahashi et al. | |
| 4,646,701 A | 3/1987 | Fukumoto | |
| 4,694,870 A | 9/1987 | Vize | |
| 4,696,409 A | 9/1987 | Vize | |
| 4,867,337 A * | 9/1989 | Eichenseer | 220/375 |
| 4,872,587 A | 10/1989 | Zimmermann et al. | |
| 4,884,716 A | 12/1989 | Steiner | |
| 4,900,346 A | 2/1990 | Lutz | |
| 5,042,678 A | 8/1991 | Munguia | |
| 5,058,693 A | 10/1991 | Murdock et al. | |
| 5,165,565 A | 11/1992 | Schlessmann et al. | |
| 5,242,072 A | 9/1993 | Koebemik | |
| 5,279,025 A | 1/1994 | Kinast | |
| 5,279,439 A * | 1/1994 | Kasugai et al. | 220/203.23 |
| 5,299,545 A | 4/1994 | Kuroda et al. | |
| 5,320,240 A | 6/1994 | Wehle et al. | |
| 5,345,917 A | 9/1994 | Maruyama et al. | |
| 5,349,934 A | 9/1994 | Miyano | |
| 5,355,863 A | 10/1994 | Yamanaka et al. | |
| 5,355,864 A | 10/1994 | Kuroda et al. | |
| 5,395,428 A | 3/1995 | Van Blutcher et al. | |
| 5,398,662 A | 3/1995 | Igarashi et al. | |
| 5,427,076 A | 6/1995 | Kobayashi et al. | |
| 5,456,236 A | 10/1995 | Wakashiro et al. | |
| 5,460,136 A | 10/1995 | Yamazaki et al. | |
| 5,487,369 A | 1/1996 | Hara et al. | |
| 5,538,542 A | 7/1996 | Watanabe et al. | |
| 5,538,543 A | 7/1996 | Watanabe et al. | |
| 5,678,523 A | 10/1997 | Hashimoto et al. | |
| 5,680,848 A | 10/1997 | Katoh et al. | |
| 5,765,539 A | 6/1998 | Isobe et al. | |
| 5,775,307 A | 7/1998 | Isobe et al. | |
| 5,803,054 A | 9/1998 | Yamazaki et al. | |
| 6,023,023 A | 2/2000 | Takeuchi | |
| 6,079,582 A | 6/2000 | Nickel et al. | |
| 6,085,922 A | 7/2000 | Esser | |
| 6,274,209 B1 | 8/2001 | Pagidas et al. | |
| 6,305,362 B1 | 10/2001 | Kitamura et al. | |
| 6,330,879 B1 | 12/2001 | Kitamura et al. | |
| 6,336,446 B1 | 1/2002 | Isobe et al. | |
| 6,347,617 B1 | 2/2002 | Kitamura et al. | |
| 6,605,135 B2 | 8/2003 | Lee et al. | |
| 6,698,611 B2 | 3/2004 | Matsubara et al. | |
| 6,866,056 B1 | 3/2005 | Scott | |
| 7,025,222 B2 | 4/2006 | Hagano et al. | |
| 7,047,948 B2 | 5/2006 | Gerhardt et al. | |
| 7,086,389 B2 | 8/2006 | Yamada | |
| 7,104,258 B2 | 9/2006 | Yamada et al. | |
| 7,261,093 B2 | 8/2007 | Groom et al. | |
| 7,267,112 B2 | 9/2007 | Donahue et al. | |
| 7,293,629 B2 | 11/2007 | Nasuno et al. | |
| 7,311,088 B1 | 12/2007 | Callahan et al. | |
| 7,320,314 B2 | 1/2008 | Kashima et al. | |
| 7,448,509 B2 | 11/2008 | Yang | |
| 7,677,277 B2 | 3/2010 | Thompson et al. | |
| 8,074,334 B2 * | 12/2011 | Tharp et al. | 29/428 |
| 8,096,438 B2 * | 1/2012 | Schmalz et al. | 220/371 |
| 8,408,415 B2 | 4/2013 | Schmalz et al. | |
| 2003/0075156 A1 | 4/2003 | Morinaga et al. | |
| 2003/0094456 A1 | 5/2003 | Matsubara et al. | |
| 2003/0098307 A1 | 5/2003 | Hagano et al. | |
| 2003/0173362 A1 | 9/2003 | Ishida et al. | |
| 2003/0234254 A1 | 12/2003 | Grybush et al. | |
| 2004/0129706 A1 | 7/2004 | Hagano et al. | |
| 2004/0154670 A1 | 8/2004 | Gerhardt et al. | |
| 2004/0256392 A1 | 12/2004 | Hagano et al. | |
| 2005/0003095 A1 | 1/2005 | Griffin et al. | |
| 2005/0072728 A1 | 4/2005 | Chang | |
| 2006/0011173 A1 | 1/2006 | Davis et al. | |
| 2006/0016436 A1 | 1/2006 | Groom et al. | |
| 2006/0037959 A1 | 2/2006 | Hokazono et al. | |
| 2006/0086738 A1 | 4/2006 | Dehn et al. | |
| 2006/0185742 A1 | 8/2006 | Kakoo | |
| 2006/0266338 A1 | 11/2006 | Kashima | |
| 2007/0068388 A1 | 3/2007 | Shears et al. | |
| 2007/0108212 A1 | 5/2007 | Nelson | |
| 2007/0151628 A1 | 7/2007 | Thompson | |
| 2007/0170187 A1 | 7/2007 | Tharp et al. | |
| 2007/0261679 A1 | 11/2007 | Tschantz | |
| 2008/0011388 A1 | 1/2008 | Wu | |
| 2008/0110889 A1 | 5/2008 | Ohsawa et al. | |
| 2009/0223959 A1 | 9/2009 | Schulz et al. | |
| 2009/0294450 A1 | 12/2009 | Schmalz et al. | |

FOREIGN PATENT DOCUMENTS

| | | |
|---|---|---|
| CN | 1718464 | 1/2006 |
| EP | 1 726 815 | 11/2006 |
| FR | 2498998 B1 | 8/1982 |
| GB | 1 394 015 A | 5/1975 |
| GB | 1 395 744 | 5/1975 |
| GB | 1394015 A | 5/1975 |
| GB | 2 337 252 | 11/1999 |
| JP | 55-143263 | 11/1980 |
| JP | 58-180147 | 12/1983 |
| JP | 60-104756 | 7/1985 |
| JP | 62-034874 | 9/1987 |
| JP | 05-240116 | 9/1993 |
| JP | 06-040462 | 2/1994 |
| JP | 06-042415 | 2/1994 |
| JP | 06-221234 | 8/1994 |
| JP | 06-280694 | 10/1994 |
| JP | 07-034985 | 2/1995 |
| JP | 07-103084 | 4/1995 |
| JP | 07-174050 | 7/1995 |
| JP | 07-187040 | 7/1995 |
| JP | 07-189823 | 7/1995 |
| JP | 07-293365 | 11/1995 |
| JP | 08-004605 | 1/1996 |
| JP | 8067282 A | 3/1996 |
| JP | 08-121263 | 5/1996 |
| JP | 08-295143 | 11/1996 |
| JP | 09-112356 | 4/1997 |
| JP | 09-193674 | 7/1997 |
| JP | 09-267783 | 10/1997 |
| JP | 10-236366 | 9/1998 |
| JP | 10-281019 | 10/1998 |
| JP | 10-297664 | 11/1998 |
| JP | 11-028941 | 2/1999 |
| JP | 11-125154 | 5/1999 |
| JP | 11-278070 | 10/1999 |
| JP | 2002-144894 | 5/2002 |
| JP | 2002-266709 | 9/2002 |
| JP | 2003-083500 | 3/2003 |
| JP | 2003-237388 | 8/2003 |
| JP | 2004-316547 | 11/2004 |
| JP | 2004-360540 | 12/2004 |
| JP | 2005-053337 | 3/2005 |
| JP | 2005-178487 | 7/2005 |
| JP | 2005-178488 | 7/2005 |
| JP | 2006-021599 | 1/2006 |
| JP | 2006-056454 | 3/2006 |
| JP | 2006-328985 | 12/2006 |
| JP | 2007-001616 | 1/2007 |
| WO | WO-2006/137521 | 12/2006 |

* cited by examiner

FUEL CAP

BACKGROUND

The present application relates generally to the field of fuel caps for fuel tanks, such as fuel tanks of internal combustion engines.

SUMMARY

One embodiment of the invention relates to a cap assembly, which includes a body and a tether. The body is configured to be fastened to a container for closing an opening in the container. An aperture is formed in the body, and the tether has a fastener, where a portion of the fastener extends through the aperture in the body. A gap is formed between the portion of the fastener and the body that allows for venting of vapors from the container around the portion of the fastener that is extending through the aperture.

Another embodiment of the invention relates to a fuel cap assembly for closing a fuel tank of an engine. The fuel cap assembly includes a body defining an interior volume, an inlet providing access to the volume, and an outlet configured to vent vapors from the volume. The inlet is configured to receive the vapors from the fuel tank, and the fuel cap assembly further includes a filter media positioned in the volume, between the inlet and the outlet, which is designed to filter the vapors. In addition, the fuel cap assembly includes a tether for securing the fuel cap to the fuel tank. The tether is coupled to the inlet such that the tether allows the vapors to pass through the inlet from the fuel tank of the engine, and such that interaction between the tether and the inlet serves to mitigate clogging of the inlet.

Yet another embodiment of the invention relates to an engine, which includes a fuel tank, a fuel cap, and a tether. The fuel tank has an opening for filling the fuel tank, and the fuel cap is configured for closing the opening. The fuel cap has an aperture for venting vapors from the fuel tank when the fuel cap is fastened to the opening of the fuel tank. The tether secures the fuel cap to the engine when the fuel cap is not fastened to the opening of the fuel tank. The tether includes a fastener, where a portion of the fastener extends through the aperture in the fuel cap. A gap is formed between the portion of the fastener and the fuel cap, and the gap allows for venting of vapors from the fuel tank around the portion of the fastener that is extending through the aperture.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Fuel caps may be designed to vent pressurized vapors (e.g., gaseous vapors, gases) from a fuel tank. Such fuel caps may include an aperture or pathway for the vapors to flow through from the fuel tank to the outside environment. Such fuel caps may also allow outside air to enter the fuel tank when pressure in the fuel tank is below ambient pressure. Typically such fuel caps and apertures or pathways are designed to minimize the release of fuel in the vapors to the outside air. Such designs may include a relatively narrow aperture or pathway. However, narrow apertures or pathways have a tendency to clog with dirt, fuel deposits, or other substances that can block the vent.

Figure 1:
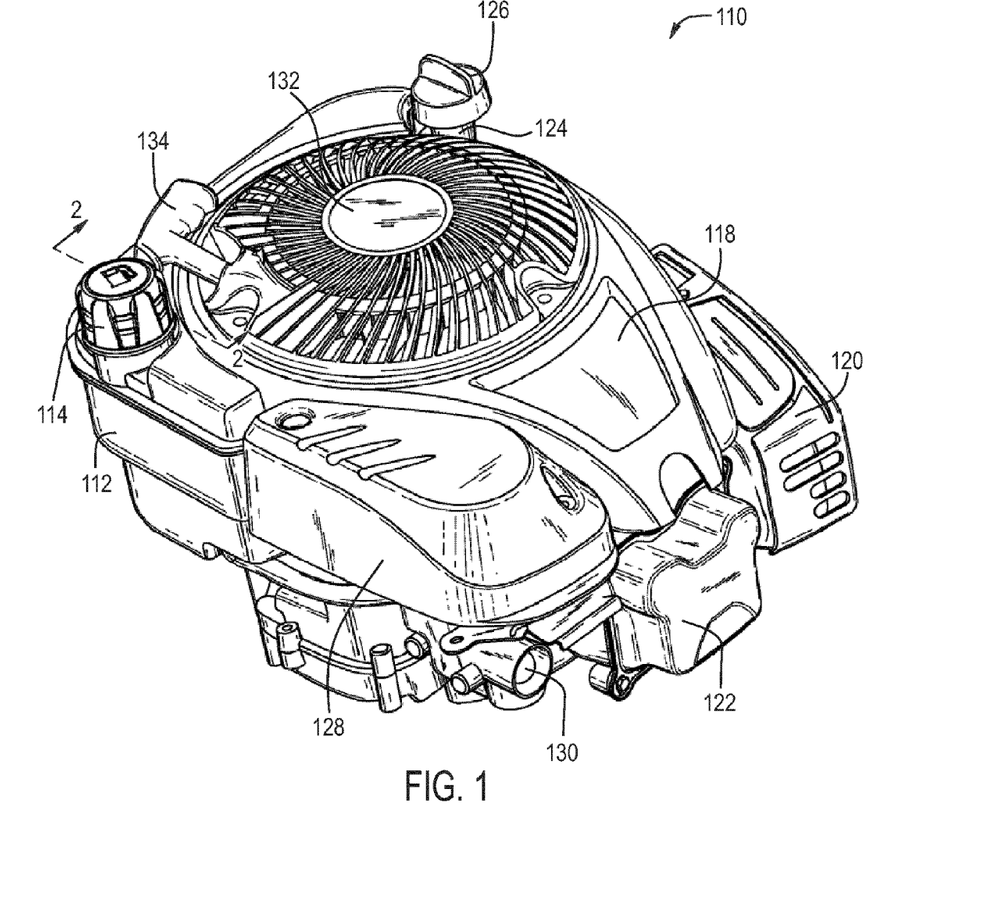
FIG. 1 is a perspective view of an engine according to an exemplary embodiment of the invention.

Referring to FIG. 1, an engine, shown as small engine 110, includes a fuel tank 112 and a cap assembly (e.g., lid, fuel cap, gas cap), shown as cap 114. The fuel tank 112 includes an opening 116 (FIG. 2) for filling the fuel tank 112, where the cap 114 is used to close the opening 116. According to an exemplary embodiment, the engine 110 further includes a cover 118, a heat shield 120 of an exhaust system, and a rocker cover 122 for overhead valves. An oil fill chute 124 and oil fill cap 126 extend upward from a side of the cover 118, opposite to the fuel tank 112. In some embodiments, the engine 110 also includes an air intake 128 and priming bulb 130, as well as a rewind 132 and handle 134 for a recoil starter system.

According to an exemplary embodiment, the engine 110 is a single-cylinder, gasoline-powered, four-stroke cycle internal combustion engine. However a broad range of engines and other fluid containers may benefit from the teachings disclosed herein. In some embodiments, the engine 110 is vertically shafted (as shown in FIG. 1), while in other embodiments, the engine may be horizontally shafted. In some contemplated embodiments, an engine may include two, three, or more cylinders, may be a diesel engine, or may have a two-stroke cycle. The engine is not limited to the particular components or configurations shown in the figures, unless expressly recited in the claims.

The engine 110 may be configured to power a broad range of equipment, including lawn mowers, pressure washers, electric generators, snow throwers, and other equipment. Furthermore, although shown in FIG. 1 in use with the engine 110, the cap 114 can be embodied with other types of engines and other containers of fluids. Further, the cap 114 can be utilized with a variety of different fuels or other fluids. In contemplated embodiments, a cap, similar to the cap 114, may be used with the oil fill chute 124. The cap of the present invention is not limited to a type of container of fluid, unless expressly recited in the claims. Additionally, the cap of the present invention is not limited to the particular round shape or dimensions shown in the figures, unless expressly recited in the claims.

Figure 2:
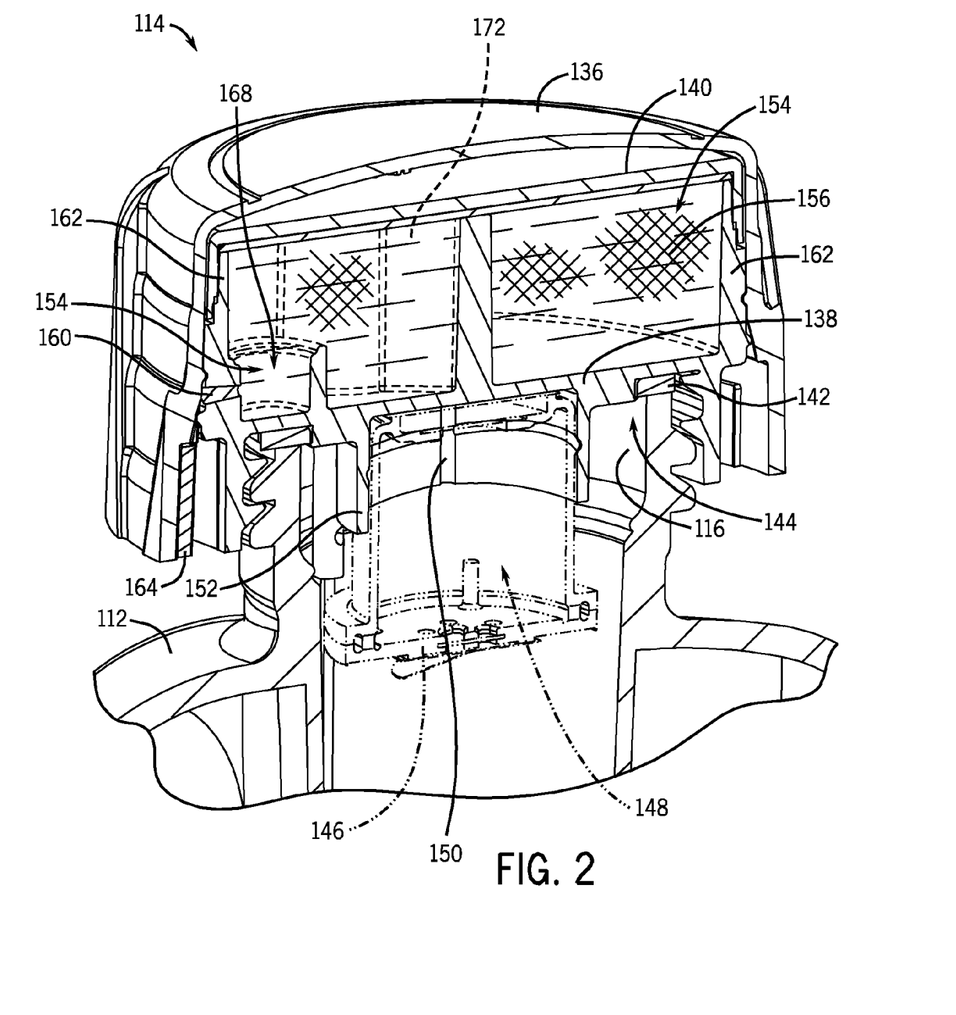
FIG. 2 is a sectional view of a fuel cap assembly of the engine of FIG. 1, taken along line 2-2 as shown in FIG. 1.

Referring to FIG. 2, the cap 114 is an assembly of several parts, including an outer housing 136, an inner housing 138, and a cover 140 for the inner housing 138. The cover 140 overlays the inner housing 138, and the outer housing 136 fastens to the inner housing 138 over the cover 140 forming a body of the cap 114. The outer housing 136, inner housing 138, and cover 140 may be fastened together via a snap-fit, threaded coupling, pressure fit, spot weld, glue, or by other types of fastening. In some contemplated embodiments, the cap does not include the cover 140, while in other contemplated embodiments the cap does not include the outer housing 136. In still other contemplated embodiments, the cap is formed as an integral piece.

According to an exemplary embodiment, the cap 114 further includes a gasket 142 (e.g., annulus, washer, ring) or other seal positioned between an underside 144 of the cap 114 and the opening 116 of the fuel tank 112. An auxiliary component 146 may be coupled to a port 148 integrated with the cap 114, on the underside 144 of the cap 114 and held within the opening 116 of the fuel tank 112. In some embodiments, the auxiliary component 146 includes a container holding fuel additive or preservative, which may flow from the auxiliary component 146 to fuel in the fuel tank 112 via channels 150 extending along a structure 152 (e.g., walls, surfaces) defining the port 148.

According to an exemplary embodiment, the inner housing 138 and the cover 140 define a volume 154 within the cap 114. The volume 154 is configured to hold a filter media 156, such as activated carbon beads, charcoal or another substance including carbon, sand, sponge, pumice, mesh, filter pads, filter paper, etc. According to an exemplary embodiment, an inlet 158 (FIG. 9) (e.g., aperture, opening, hole) for the volume 154 extends through the inner housing 138 on the underside 144 of the cap 114, and an outlet 160 (e.g., aperture, opening, hole) for the volume 154 extends through the inner housing 138 on a side 162 (e.g., wall) of the inner housing 138. In certain embodiments that include the port 148 for the auxiliary component 146, the inlet 158 is positioned between structure 152 for the port 148 and the portion of the underside 144 of the cap positioned over the structure defining the opening 116 of the fuel tank 112, such that the inlet 158 of the cap 114 is open to the vapors of the fuel tank 112 when the cap 114 is fastened to the opening 116 of the fuel tank 112.

Filtered vapors moving out of the volume 154 through the outlet 160 are in fluid communication with outside air. In some embodiments, the outlet 160 leads directly to the outside air, while in other embodiments, the outlet 160 directs air to a space between the inner and outer housings 138, 136, which is open to the outside air. In alternative embodiments, the outlet 160 extends through the cover 140 for the inner housing 138, while in other contemplated embodiments, the outlet 160 extends through the underside 144 of the inner housing 138 proximate to or through an outer edge of the inner housing 138, such that the outlet 160 is in communication with outside air, as opposed to open to the vapors of the fuel tank 112. In contemplated embodiments, the cap does not include an interior volume, and an aperture through the cap allows for venting.

Figure 3:
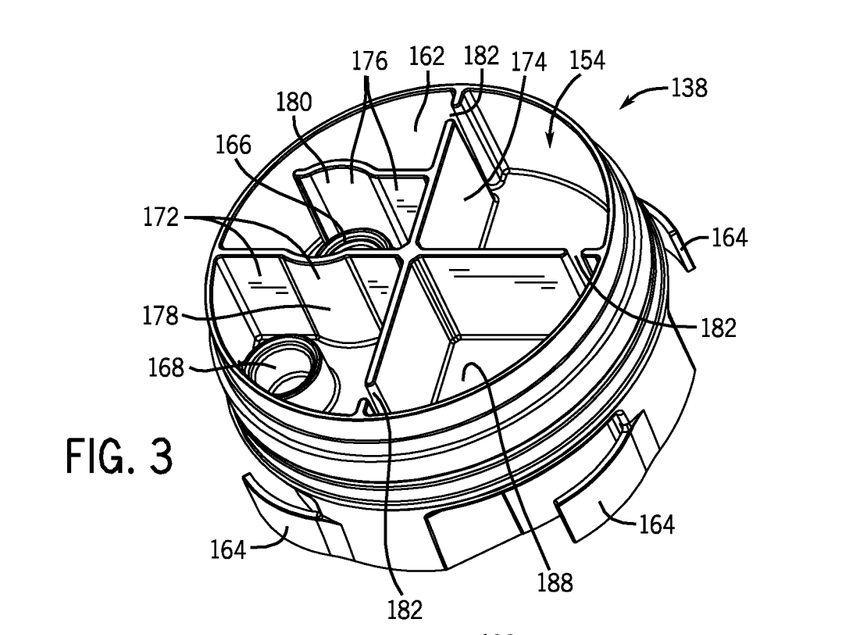
FIG. 3 is a perspective view from above of a part of the gas cap assembly of FIG. 2.
Figure 9:
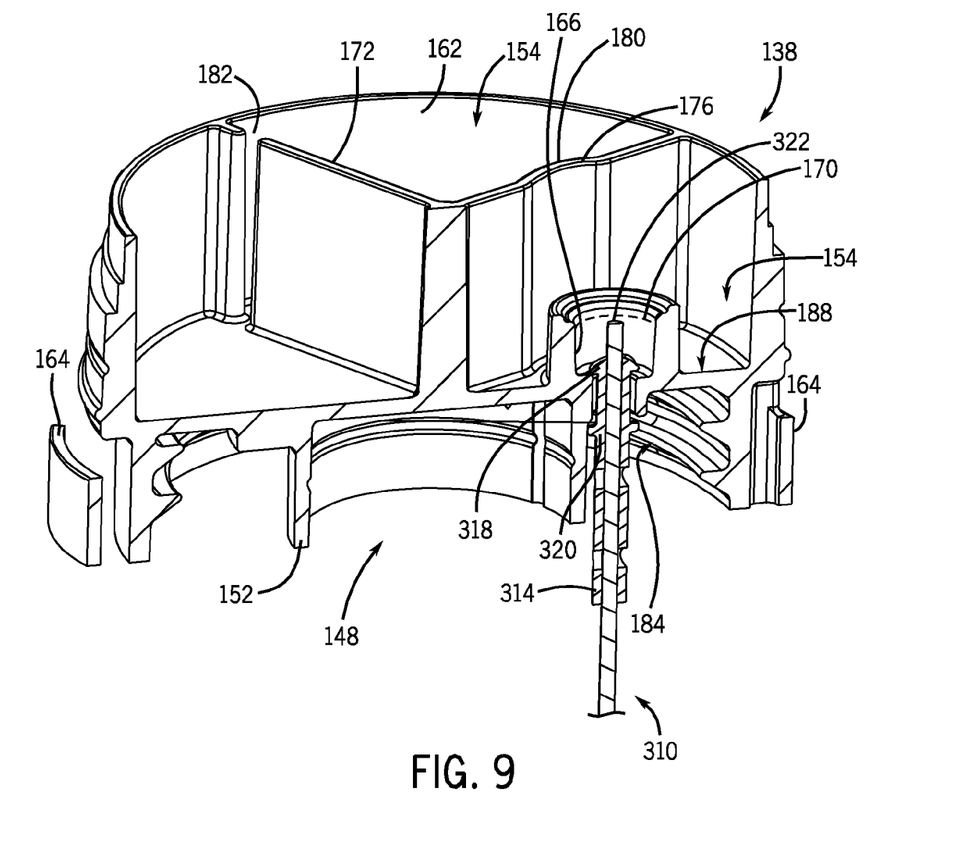
FIG. 9 is a sectional view of the of the part of the gas cap of FIG. 3 connected to the tether of FIG. 6, taken along line 9-9 as shown in FIG. 8.

Referring to FIG. 3, the inner housing 138 includes locking pieces 164 for fastening the outer and inner housings 136, 138 (e.g., latching), a port 166 for the inlet 158 (FIG. 9), and a port 168 for the outlet 160. Each port 166, 168 is configured to support a screen 170 (see, e.g., screen 170 as shown in FIG. 9) separating the filter media 156 (FIG. 2) from the respective inlet 158 and outlet 160. In some embodiments, the inner housing 138 further includes one or partitions 172, 174, 176 (e.g., baffles, walls) extending at least partially across the volume 154. The partitions 172, 174, 176 increase the path length of vapors flowing through the filter media 156, from the inlet 158 to the outlet 160, which is intended to increase the filtration of fuel or other substances from the vapors. In contemplated embodiments, one or more partitions extend from a cover, similar to the cover 140 (FIG. 2).

According to an exemplary embodiment, the three partitions 172, 174, 176 at least partially surround the inlet 158. The first partition 172 extends between the port 166 for the inlet 158 and the port 168 for the outlet 160. The second partition 174 is substantially transverse to the first partition 172. The third partition 176 is substantially parallel with the first partition 172, but is shorter than the first partition 172 in some embodiments. Positioning the three partitions 172, 174, 176 around the port 166 for the inlet 158 guides the vapors through the filter media 156 along a path intended to improve filtration of fuel or other substances from the vapors.

Figure 4:
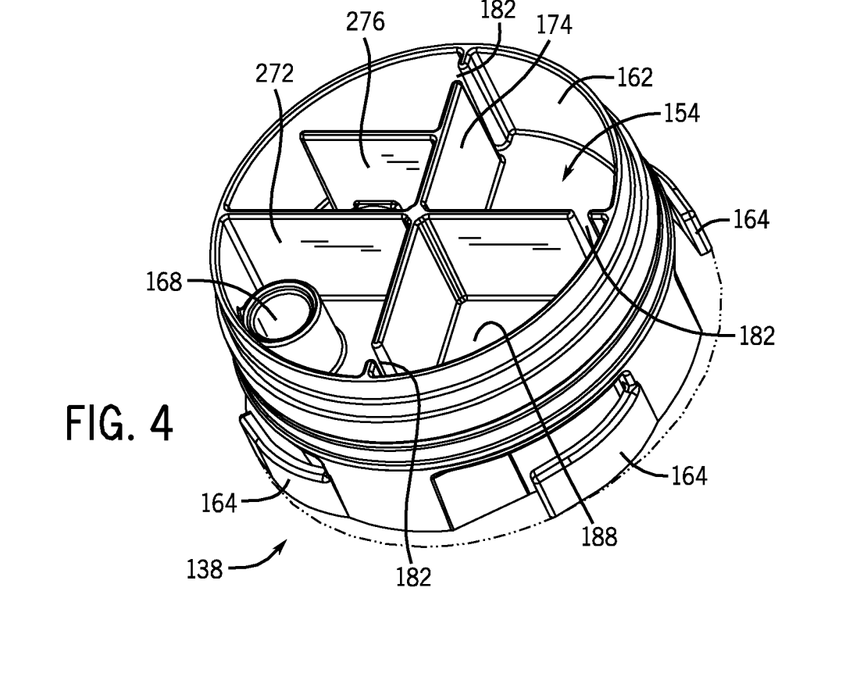
FIG. 4 is a perspective view from above of a part of a gas cap assembly according to another exemplary embodiment of the invention.
Figure 5:
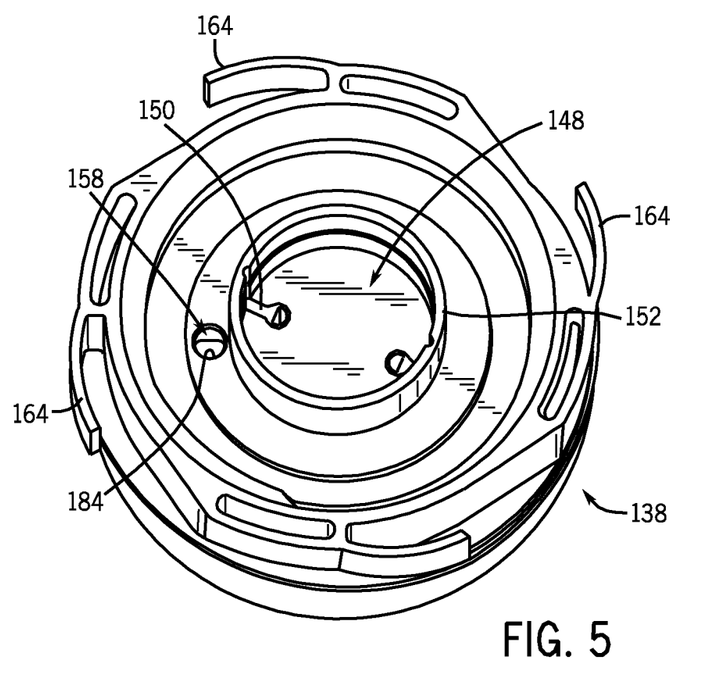
FIG. 5 is a perspective view from below of the part of FIG. 3.
Figure 6:
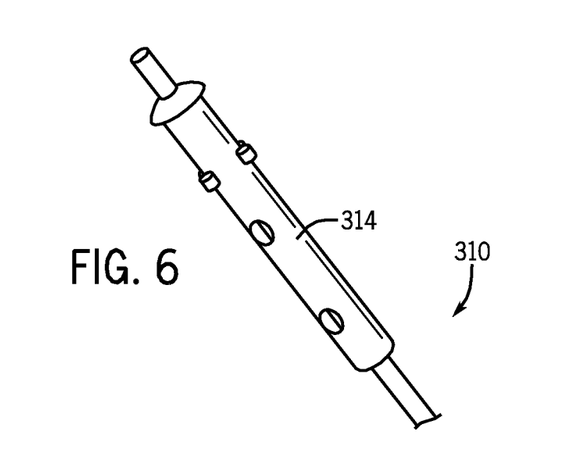
FIG. 6 is a perspective view of a tether according to an exemplary embodiment of the invention.
Figure 7:
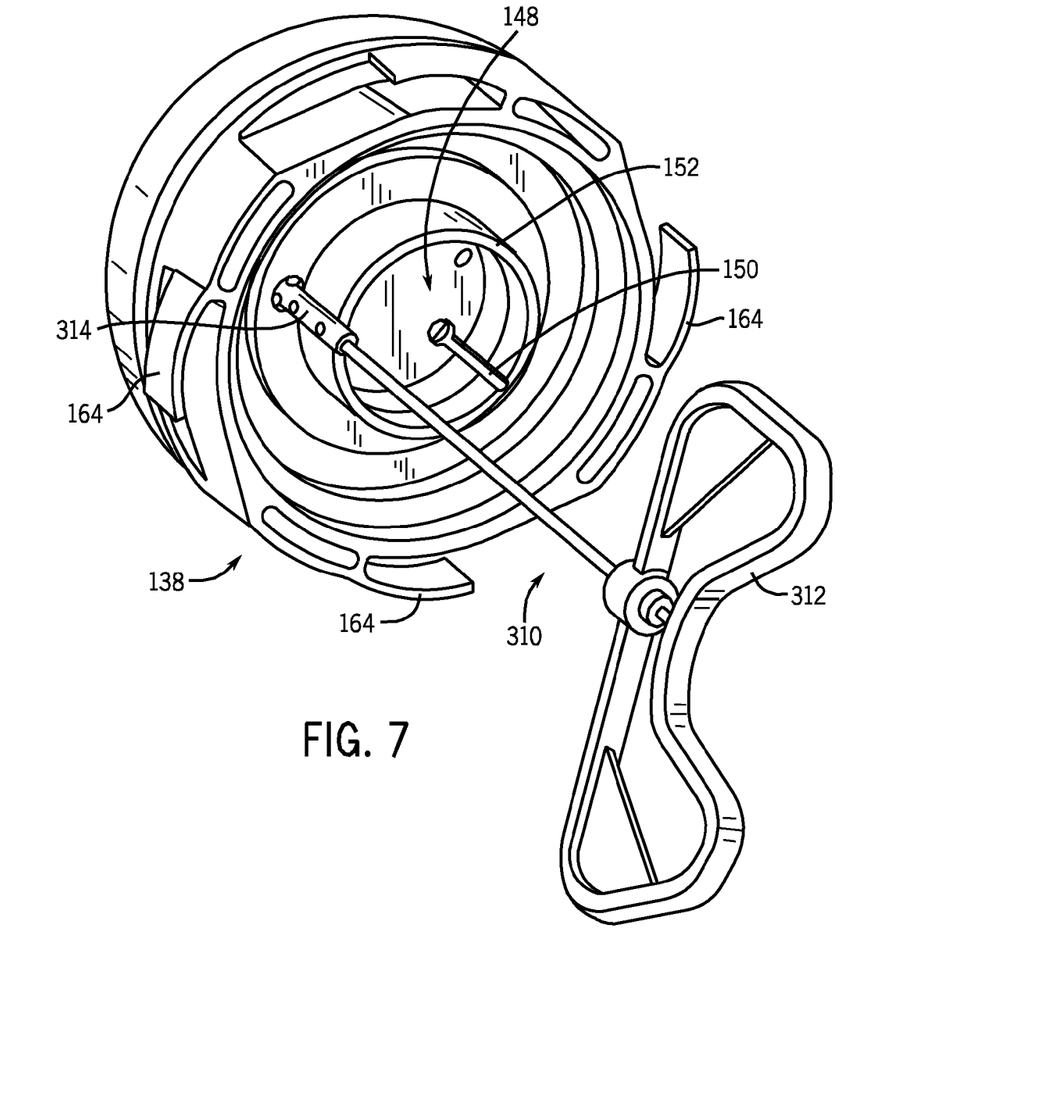
FIG. 7 is a perspective view from below of the part of the gas cap assembly of FIG. 3 connected to the tether of FIG. 6.
Figure 8:
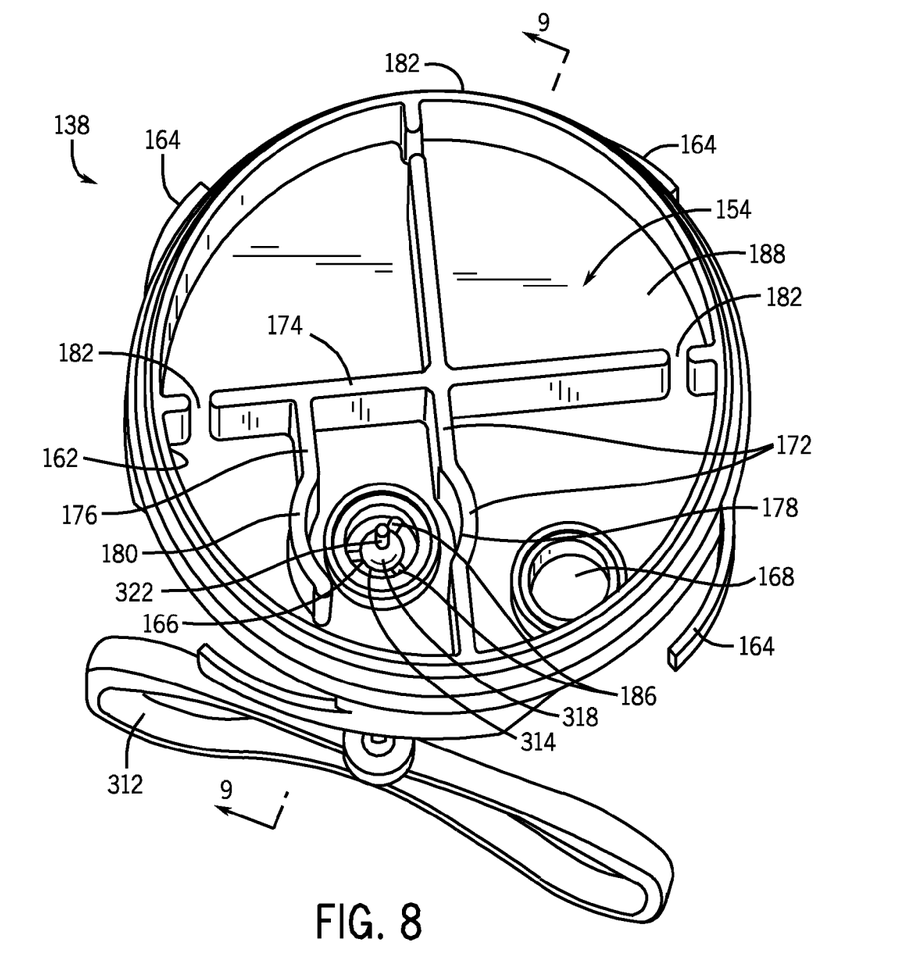
FIG. 8 is a perspective view from above of the part of the gas cap assembly of FIG. 3 connected to the tether of FIG. 6.

According to an exemplary embodiment, the first and third partitions 172, 176 include arcuate portions 178, 180 that at least partially curve around the port 166 for the inlet 158, while in the exemplary embodiment of FIG. 4, first and third partitions 272, 276 are straight. In other contemplated embodiments, the cap includes any number of partitions, including zero partitions, and the partitions may be arranged in a variety orientations with respect to each other, the cover 140, and the inner housing 138.

According to an exemplary embodiment, the cap 114 further includes pathways 182 (e.g., passages, grooves, openings) within the volume 154 allowing the vapors to flow around the partitions 172, 174, 176. The pathways 182 are designed to control the flow of vapors around the partitions 172, 174, 176, so as to increase the path length of the vapors through the filter media 156 or to increase the volume of filter media 156 exposed the vapors. In some embodiments, the pathways 182 are positioned proximate to the sides 162 of the volume 154, extending vertically within the volume 154. In other embodiments, horizontal pathways are positioned on the top or bottom of the partitions 172, 174, 176, or alternately between tops and bottoms of the partitions 172, 174, 176. In still other embodiments, partitions are designed to not be flush with the cover 140 or with a floor 188 of the inner housing 138, so that vapors flow between the tops or bottoms of the partitions and the respective cover or floor of the inner housing. In contemplated embodiments, the partitions include apertures at various locations along the partitions, providing multiple pathways for the same partition.

Referring to FIGS. 5-9, the body of the cap 114 includes an aperture 184, which is shown as the inlet 158 to the volume 154. In other embodiments, the aperture 184 may extend entirely through the body of a cap, and not into a volume within the cap. According to the exemplary embodiment of FIGS. 5-9, the cap assembly further includes a tether 310 fastened to an anchor 312 or to another portion of the engine 110 (FIG. 1). The tether 310 is also designed to be fastened to the body of the cap 114 for securing the cap 114 to the engine 110 (FIG. 1) when the cap 114 is not fastened to the opening 116 of the fuel tank 112.

The tether 310 includes a fastener 314 (e.g., attachment end, coupling, connector) designed to be fastened to the aperture 184, without completely blocking the aperture 184. In some embodiments, the fastener 314 of the tether 310 extends through the aperture 184. A gap 316 (FIG. 9) is defined between a portion of the fastener 314 and the body of the cap 114, allowing vapors from the fuel tank 112 to flow around the fastener 314 and into the volume 154 or to outside air. In other contemplated embodiments, hooks, glue, pins, or other fastening elements may be used to fasten the tether 310 to the aperture 184.

According to an exemplary embodiment, spacing of the fastener 314 of the tether 310 relative to the body of the cap 114 in the aperture 184 allows for movement (i.e., translation or rotation) of the fastener 314 relative to the body, serving to mitigate clogging of the gap 316. Movement of the fastener 314 relative to the body of the cap 114 may occur as an operator is handling the cap 114, such as when the cap 114 is removed or attached to the opening 116 of the fuel tank 112.

According to an exemplary embodiment, the fastener 314 slides up and down against the body of the cap 114 in the aperture 184, which pushes or pulls debris between the fastener 314 and body that may otherwise clog the gap 316 between the fastener 314 and the body. In some embodiments, the fastener 314 is designed to rotate within the aperture 184 about a longitudinal axis of the fastener 314 or another axis of rotation. Rotational movement of the fastener 314 is intended to loosen or remove debris that may otherwise clog the gap 316 between the fastener 314 and the body of the cap 114.

In some embodiments, the fastener 314 of the tether 310 includes a first flange 318 and a second flange 320, where each flange 318, 320 includes a cross section that is wider than the aperture 184. During assembly, the fastener 314 is designed to be inserted through the aperture 184. The first flange 318 then limits movement (i.e., decreases the potential range of motions) of the fastener 314 relative to cap 114, on one side of the aperture 184. The second flange 320 limits movement of the fastener 314 relative to the cap 114, on the other side of the aperture 184. However, the first and second flanges 318, 320 are spaced apart relative to each other so that the fastener 314 is still able to move relative to the body of the cap 114, to a limited degree. For example, in contemplated embodiments the fastener 314 is able to translate within the aperture 184 by less than a half-inch and rotate within the aperture 184 by less than 30-degrees about an axis transverse to the longitudinal axis of the fastener 314.

According to an exemplary embodiment, the port 166 for the inlet 158 includes one or more protrusions 186 (FIG. 8) designed to elevate the first flange 318 above the floor 188 of the inner housing 138, allowing the gap 316 between the fastener 314 and the body of the cap 114 to further extend around the first flange 318. When the first flange 318 is contacting the protrusions 186, the gap 316 extends around the second flange 320. In some such embodiments, the weight of the tether 310 or other protrusions, separate the second flange 320 from the body of the cap 114 on the other side of the aperture 184. The protrusions 186 may extend from the flanges 318, 320 or elsewhere on the fastener 314, or may extend from the body of the cap 114, such as extending upward from the floor 188 of the inner housing 138 within the port 166 for the inlet 158.

According to an exemplary embodiment, the tether 310 further includes an extension 322 located above the first flange 318 on the fastener 314. The extension 322 is configured to serve as a guide boss for facilitating assembly of the cap 114, allowing for easier insertion of the fastener 314 within the aperture 184. In contemplated embodiments, the extension 322 may be used with the first flange 318 to limit movement of the fastener 314 relative to the body of the cap 114, in place of the second flange 320 or in conjunction with the second flange 320. In such contemplated embodiments, contact between the extension 322 and a screen 170, filter media 156, or a surface of the cap 114 limits movement of the fastener 314 relative to the body of the cap 114. In other embodiments, the tether 310 is designed not to contact the screen 170.

The construction and arrangements of the engine and fuel cap, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A cap assembly, comprising:
    a body configured to be fastened to a container for closing an opening in the container;
    an aperture formed in a floor of the body;
    a tether having a fastener, wherein a portion of the fastener extends through the aperture in the body, wherein the cross section of the portion of the fastener is at least fifty percent the size of the cross section of the aperture, and wherein the fastener further comprises a first flange positioned on a first side of the aperture inside the body; and
    a plurality of protrusions extending upward from the floor of the body to space the first flange apart from the floor of the body to prevent the fastener from blocking the aperture, wherein the plurality of protrusions are spaced apart from one another by a plurality of gaps that allow venting of vapors from the container around the portion of the fastener extending through the aperture, and wherein contact between the first flange and the protrusions limits movement of the fastener relative to the body.

2. The cap assembly of claim 1, wherein the fastener further comprises a second flange positioned on a second side of the aperture opposite to the first side, wherein contact between the second flange and the body limits movement of the fastener relative to the body.

3. The cap assembly of claim 1, wherein the spacing of the first and second flanges relative to the body, and the gap between the portion of the fastener and the body allow for movement of the fastener relative to the body, serving to mitigate clogging of the gap.

4. A fuel cap assembly for closing a fuel tank of an engine, comprising:
    a body defining an interior volume;
    an inlet providing access to the volume and configured to receive vapors from the fuel tank;
    an outlet configured to vent the vapors from the volume;
    activated carbon filter media positioned in the volume between the inlet and the outlet and configured to filter the vapors; and
    a tether for securing the fuel cap to the fuel tank, wherein the tether is coupled to the inlet such that the tether allows the vapors to pass through the inlet from the fuel tank of the engine, and such that interaction between the tether and the inlet serves to mitigate clogging of the inlet, wherein a portion of the tether extends through the inlet forming a gap between the portion and the body, and wherein the cross-sectional area of the portion is greater than the cross-sectional area of the gap.

5. The fuel cap assembly of claim 4, wherein the inlet is located on an underside of the body and wherein the outlet is located on a side of the body.

6. The fuel cap assembly of claim 4, further comprising:
three partitions at least partially surrounding the inlet, increasing a flow path of the vapors from the inlet, through the filter media, and to the outlet.

7. The fuel cap assembly of claim 6, wherein a first partition of the three partitions extends between the inlet and the outlet, a second partition of the three partitions is substantially transverse to the first partition, and a third partition of the three partitions is substantially parallel to the first partition.

8. The fuel cap assembly of claim 7, wherein the first partition is longer than the third partition.

9. The fuel cap assembly of claim 7, wherein the first and third partitions have arcuate portions.

10. The fuel cap assembly of claim 9, wherein the arcuate portions at least partially curve around the inlet.

11. The fuel cap assembly of claim 4, further comprising:
a protrusion extending from either the fastener or the body to space a first flange of the fastener apart from the body to form a gap.

12. The cap assembly of claim 1, wherein the aperture is round.

13. The cap assembly of claim 1, wherein the first flange has a cross section that is wider than the cross section of the aperture.

14. The cap assembly of claim 13, further comprising:
activated carbon filter media within the body; and
a screen positioned to separate the activated carbon filter media from the aperture;
wherein the fastener includes an extension located above the first flange and wherein contact between the screen and the extension limits movement of the fastener relative to the body.

15. The fuel cap assembly of claim 4, further comprising:
a screen positioned to separate the activated carbon filter media from the inlet.

16. A cap assembly, comprising:
a body configured to be fastened to a container for closing an opening in the container;
an aperture formed in the body;
a tether having a fastener, wherein a portion of the fastener extends through the aperture in the body, wherein the cross section of the portion of the fastener is at least fifty percent the size of the cross section of the aperture, and wherein the fastener further comprises a first flange positioned on a first side of the aperture inside the body; and
a protrusion extending from the first flange to space the first flange apart from the body to prevent the fastener from blocking the aperture by forming a gap that allows venting of vapors from the container around the portion of the fastener extending through the aperture, and wherein contact between the protrusion and the body limits movement of the fastener relative to the body.

17. The cap assembly of claim 1, wherein the cross section of the portion of the fastener is at least sixty percent the size of the cross section of the aperture.

18. The cap assembly of claim 1, wherein the cross section of the portion of the fastener is at least seventy percent the size of the cross section of the aperture.

19. The cap assembly of claim 16, wherein the cross section of the portion of the fastener is at least sixty percent the size of the cross section of the aperture.

20. The cap assembly of claim 16, wherein the cross section of the portion of the fastener is at least seventy percent the size of the cross section of the aperture.

* * * * *